United States Patent
Ko et al.

(10) Patent No.: US 9,385,799 B2
(45) Date of Patent: Jul. 5, 2016

(54) METHOD AND APPARATUS FOR JOINT PROCESSING AND PRECODING MODE SELECTION BASED ON LIMITED FEEDBACK IN MOBILE COMMUNICATION SYSTEM

(75) Inventors: Eun-Seok Ko, Seongnam-si (KR); Yung-Soo Kim, Seongnam-si (KR); Sanghoon Lee, Seoul (KR); Hojae Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 824 days.

(21) Appl. No.: 13/405,189

(22) Filed: Feb. 24, 2012

(65) Prior Publication Data
US 2012/0219043 A1      Aug. 30, 2012

(30) Foreign Application Priority Data

Feb. 24, 2011    (KR) .......................... 10-2011-0016340

(51) Int. Cl.
*H04B 7/02*     (2006.01)
*H04B 7/06*     (2006.01)

(52) U.S. Cl.
CPC .............. *H04B 7/0632* (2013.01); *H04B 7/024* (2013.01); *H04B 7/063* (2013.01); *H04B 7/0639* (2013.01); *H04B 7/0689* (2013.01)

(58) Field of Classification Search
CPC .. H04B 7/0452; H04B 7/0626; H04B 7/0408; H04B 7/0417
USPC .......................................... 375/267
See application file for complete search history.

(56) References Cited

U.S. PATENT DOCUMENTS

| | | | |
|---|---|---|---|
| 2007/0064829 A1* | 3/2007 | Zheng et al. .................. | 375/267 |
| 2009/0239473 A1* | 9/2009 | Lee et al. ..................... | 455/67.11 |
| 2009/0247175 A1* | 10/2009 | van Rensburg et al. ...... | 455/450 |
| 2010/0316163 A1* | 12/2010 | Forenza et al. ............... | 375/296 |

* cited by examiner

*Primary Examiner* — David S Huang

(57) ABSTRACT

According to one embodiment, a method of a base station configured to select a precoding mode in a mobile communication system. When channel estimate information is received from at least one terminal, the channel estimate information is collected, so that user grouping is performed according to one precoding scheme from among multiple precoding schemes. Individual user scheduling is performed according to each precoding scheme, so that a service candidate group set is generated. The selected precoding scheme is maximized according to a transmission capacity of a service candidate group set for each precoding scheme. Data is then transmitted to a determined candidate group set using the determined precoding scheme.

20 Claims, 6 Drawing Sheets

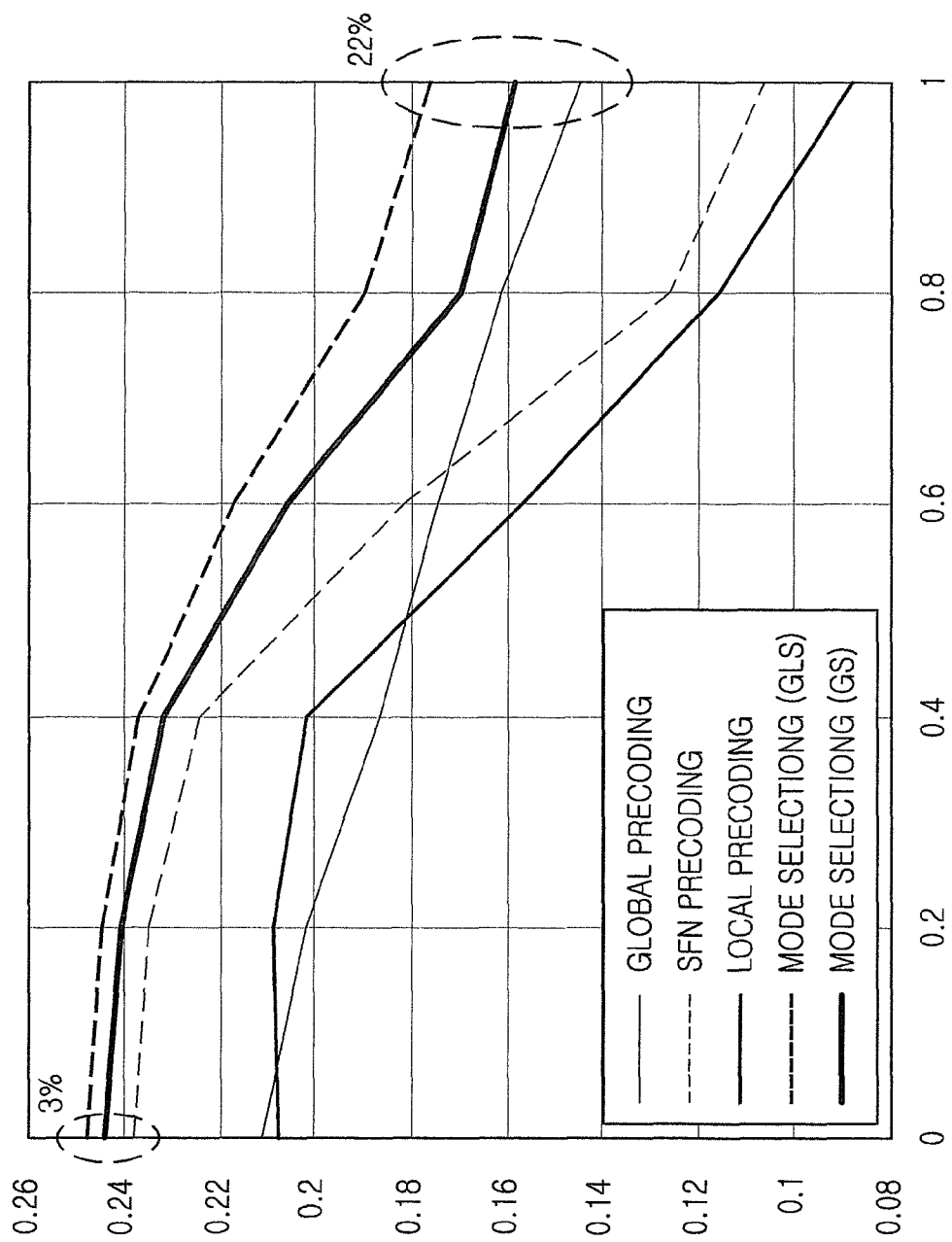

METHOD AND APPARATUS FOR JOINT PROCESSING AND PRECODING MODE SELECTION BASED ON LIMITED FEEDBACK IN MOBILE COMMUNICATION SYSTEM

CROSS REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Feb. 24, 2011 and assigned Serial No. 10-2011-0016340, the entire disclosure of which is hereby incorporated by reference.

TECHNICAL FIELD OF THE INVENTION

The present invention relates generally to mobile communication systems, and more particularly, to a method and an apparatus for joint processing and precoding mode selection based on limited feedback in a mobile communication system.

BACKGROUND OF THE INVENTION

Various types of precoding schemes may be used depending on a spatial position or time-varying conditions in a mobile communication system. Nevertheless, each precoding scheme may have different characteristics. That is, since each precoding scheme has a particular correlation between complexity of a processing procedure for transmission and a feedback weight generated by a terminal, each precoding scheme may have a performance difference depending on time-varying channel environments in a limited feedback environment.

SUMMARY OF THE INVENTION

To address the above-discussed deficiencies of the prior art, it is a primary aspect of the present invention to provide a method and an apparatus for joint processing and precoding mode selection based on limited feedback in a mobile communication system.

Another aspect of the present invention is to provide a method and an apparatus for obtaining a higher transmission capacity by selecting a more efficient transmission technique within a range of feedback techniques having a fixed number of precoding schemes in a mobile communication system.

Still another aspect of the present invention is to provide a method and an apparatus for selecting a precoding scheme having a maximum capacity from among multiple precoding schemes having differences in transmission capacity depending on a channel environment in a mobile communication system.

In accordance with an aspect of the present invention, a method of a base station for selecting a precoding mode in a mobile communication system includes, when receiving channel estimate information from at least one terminal, collecting the channel estimate information to perform user grouping according to a precoding scheme from among multiple precoding schemes, performing individual user scheduling according to each precoding scheme to generate a service candidate group set, determining a precoding scheme that maximizes a transmission capacity of a service candidate group set for each precoding scheme, and transmitting data to a determined candidate group set using the determined precoding scheme.

In accordance with another aspect of the present invention, a method for selecting a precoding mode in a mobile communication system of a terminal includes performing channel estimation on a reference signal received from a base station to select a precoding scheme from among multiple precoding schemes, feeding back channel information regarding a determined precoding scheme to the base station, and receiving data from the base station according to the determined precoding scheme.

In accordance with still another aspect of the present invention, a base station configured to select a precoding mode in a mobile communication system includes a user grouping unit configured to, when receiving channel estimate information from at least one terminal, collecting the channel estimate information to perform user grouping according to a precoding scheme from among multiple precoding schemes, a scheduler configured to perform individual user scheduling according to each precoding scheme to generate a service candidate group set, and determine a precoding scheme that maximizes a transmission capacity of a service candidate group set for each precoding scheme, and a transmitter configured to transmit data to a determined candidate group set using the determined precoding scheme.

In accordance with yet another aspect of the present invention, a terminal, configured to select a precoding mode in a mobile communication system includes a receiver configured to perform channel estimation on a reference signal received from a base station, and receive data from the base station according to a determined precoding scheme from among multiple precoding schemes, a mode selector configured to select a precoding scheme based on a channel estimate result, and a transmitter configured to feeding back channel information regarding a determined precoding scheme to the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning, and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5B illustrates an example performance analysis result of a system according to an embodiment of the present invention.

Throughout the drawings, like reference numerals will be understood to refer to like parts, components and structures.

DETAILED DESCRIPTION OF THE INVENTION

Figure 1:
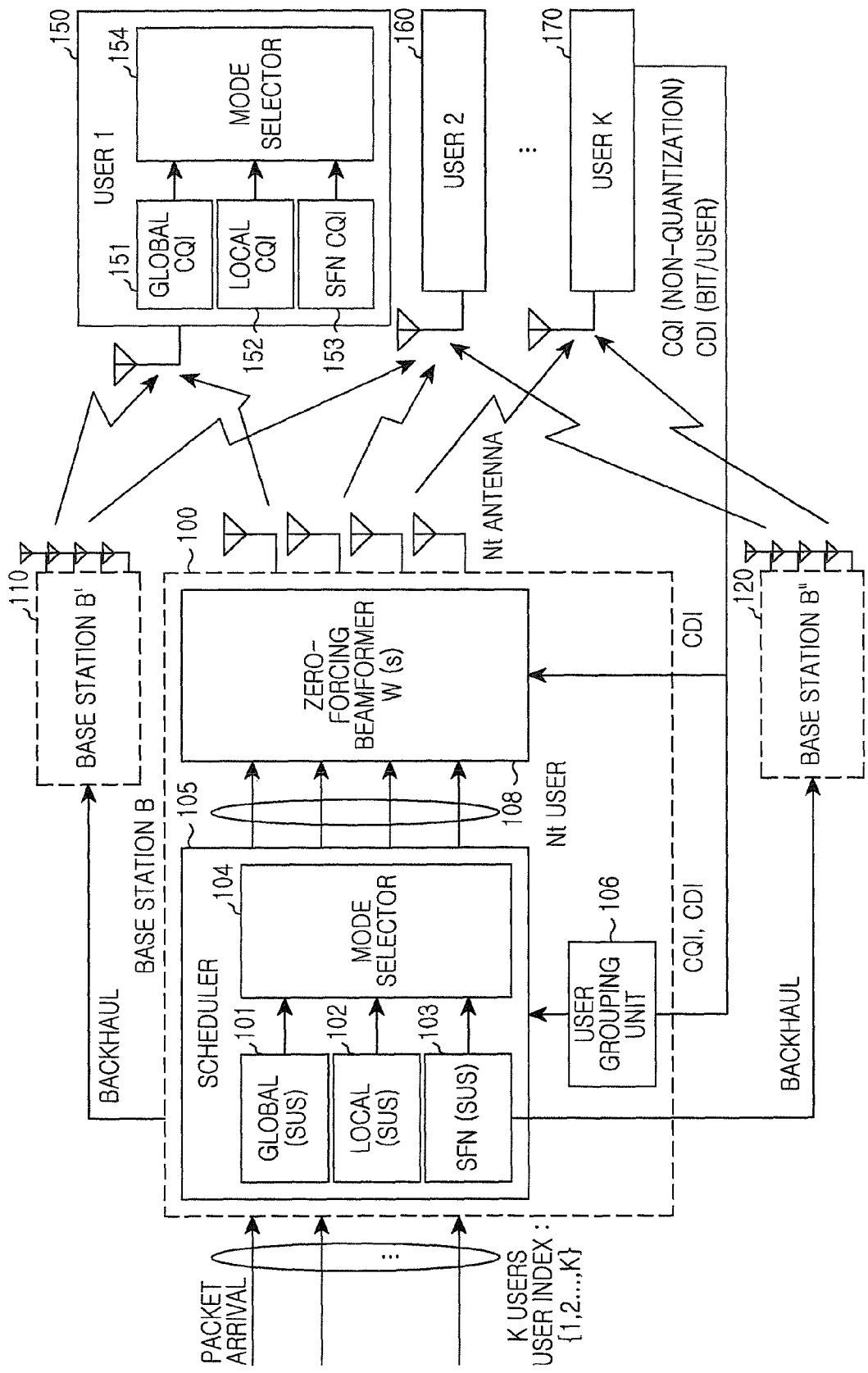
FIG. 1 illustrates an example mobile communication system according to an embodiment of the present invention.

FIGS. 1 through 5B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a method and an apparatus for a cooperative process and precoding mode selection in transmission based on limited feedback in a mobile communication system.

More particularly, the present invention relates to a method and an apparatus for determining a precoding mode in order to efficiently change a precoding scheme depending on a channel state under a Coordinated Multi-Point transmission Joint Processing/Transmission (CoMP-JPT) environment based on a limited feedback in a mobile communication system.

Generally, precoding schemes of a CoMP-JPT environment may be roughly classified into three types. First, multiple base stations may be regarded as one large super-base station (BS) and a channel operating between one terminal and the super-base station is extended, so that a spatial diversity is obtained. The present invention defines this as a global precoding scheme. Second, a local precoding scheme of receiving data from a plurality of base stations at the same time under an independent channel environment may be enabled. Last, a Single Frequency Network (SFN) precoding scheme that sums channels between multiple base stations and one terminal and uses the same may be enabled.

In the present invention, a terminal that receives a cooperative (or joint) transmission service of multiple base stations determines a Channel Quality Indicator (CQI) and a Channel Direction Indicator (CDI) estimated depending on a channel change, determines a precoding scheme having a highest CQI in feeding back relevant information in a limited manner, and performs CQI and CDI feedback on the determined precoding scheme.

A base station that receives feedback information classifies channel environment information of the terminal according to a particular precoding scheme, and shares the information with base stations that perform the cooperative transmission technique via a backhaul network.

The base stations that perform the cooperative transmission finally select whether to provide a service to terminals classified according to the determined precoding scheme and provide the service.

In the case where a base station determines a precoding scheme via which a service is received depending on a channel change and efficiently selects terminals classified according to the determined precoding scheme, a link transmission capacity formed depending on a channel change of a terminal may increase the efficiency of communication.

In the present invention, a base station shares channel information of a terminal via a backhaul network. With respect to the number K of all terminals, it is assumed that the number of transmission antennas of the base station is $N_t$, and a reception antenna of the terminal is a single antenna. Generally, a reception signal of a terminal k serviced by a base station b may be expressed by Equation (1). In the present invention, the terminal may also be referred to as a user.

$$y_{b,k} = \sqrt{\rho h_{b,k}} \, w_{b,k} s_{b,k} + \sqrt{\rho h_{b,k}} \underbrace{\sum_{j \in S_b, j \neq k} w_{b,j} s_{b,j}}_{\text{Inter-user interference}} + \sqrt{\rho} \underbrace{\sum_{b' \in B, b' \neq b} h_{b',k} \sum_{l \in S_b} w_{b',l} s_{b',l}}_{\text{Inter-cell interference}} + n_{b,k} \quad (1)$$

where $h_{b,k}$ represents an $1 \times N_t$ channel vector between a home base station b and a terminal k, $w_{b,k}$ represents an $N_t \times 1$ transmit weight vector, $s_{b,k}$ represents a transmit symbol, $h_{b,k}$ represents a $1 \times N_t$ interference channel vector between a neighbor base station b' and a terminal k, and $w_{b',l}$ and $s_{b',l}$ are an $N_1 \times 1$ transmit weight vector of a neighbor base station b' and a transmit symbol, respectively, $S_b$ represents a set of terminals serviced by a base station b, and B represents a set of all base stations.

A signal at a reception end has an Inter-user Interference (IUI) that occurs when a home cell services multiple terminals, and an Inter-cell Interference (ICI) that occurs when a neighbor cell services other terminals.

Generally, in the case where a home base station services a terminal based on a Zero-forcing Beamforming (ZFBF), an IUI with respect to a relevant terminal may be cancelled. In addition, under a CoMP-JPT environment, an ICI from a base station performing a cooperative transmission service may be cancelled. However, when limited feedback is assumed, an ICI may not be completely canceled.

Under the CoMP-JPT environment, a reception signal of a terminal k may be expressed using Equation (2) depending on a precoding scheme.

$$y_{b,k} = \sqrt{\rho}\, h_{b,k}^{(Mode)} w_{b,k}^{(Mode)} s_{b,k} + \underbrace{\sqrt{\rho}\, h_{b,k}^{(Mode)} \sum_{j \in S_b, j \neq k} w_{b,j}^{(Mode)} s_{b,j}}_{\text{Inter-user interference}(x)} +$$

$$\underbrace{\sqrt{\rho} \sum_{\bar{b} \in B, \bar{b} \neq b, \bar{b} \neq b', \bar{b} \neq b''} h_{\bar{b},k} \sum_{l \in S_{\bar{b}}} w_{\bar{b},l} s_{\bar{b},l} + n_{b,k}}_{\text{Inter-cell interference}}$$

$$h_{b,k}^{(Mode)} = \begin{cases} h_{b,k}^{(Global)} w_{b,k}^{(Global)} = [\, h_{b,k} \quad h_{b',k} \quad h_{b'',k}\,][\, w_{b,k} \quad w_{b',k} \quad w_{b'',k}\,]^T \\ h_{b,k}^{(Local)} w_{b,k}^{(Local)} = \left[\left(\sum_{\bar{b}} h_{\bar{b},k} w_{\bar{b},k}\right)\right], \bar{b} = b, b', b'' \\ h_{b,k}^{(SFN)} w_{b,k}^{(SFN)} = \left[\left(\sum_{\bar{b}} h_{\bar{b},k}\right) w_{\bar{b},k}\right], \bar{b} = b, b', b'' \end{cases} \quad (2)$$

where $h_{b,k}$ represents an $1 \times N_t$ channel vector between a home base station b and a terminal k, $w_{b,k}$ represents an $N_t \times 1$ transmit weight vector, $s_{b,k}$ represents a transmit symbol, $h_{b,k}$ represents a $1 \times N_t$ interference channel vector between a neighbor base station b' and a terminal k, $w_{b',1}$ and $s_{b',1}$ are an $N_t \times 1$ transmit weight vector of a neighbor base station b' and a transmit symbol, respectively, $S_b$ represents a set of terminals serviced by a base station b, and B represents a set of all base stations.

According to one embodiment of the present invention a base station may efficiently determines a precoding scheme according to a reception signals from terminals and service the terminals classified according to the determined precoding scheme.

In the above-described precoding scheme, a local precoding scheme is also called a non-coherent precoding scheme and generally refers to a scheme for providing the same data service to one or multiple terminals using a precoding weight different for each cell based on CDI information for each cell.

As in Equation (2), three base stations are configured with a precoding weight $w_{\bar{b},k}$ independently with respect to a channel $h_{\bar{b},k}, \bar{b}=b,b',b''$, respectively, to a k-th terminal and use the same to communicate with the terminals.

Since a reception end performs non-coherent combining for an independent channel, it may not obtain an optimized performance. In addition, since the reception end should feed back CDI information regarding each individual channel, an overhead for feedback may be relatively large.

The SFN precoding scheme is also called a coherent precoding scheme, and generally refers to a transmission scheme in which multiple cells provide the same data service to one or multiple terminals using the same precoding weight.

As in Equation (2), a form where channels $h_{\bar{b},k}, \bar{b}=b,b',b''$ from three base stations to an k-th terminal are summed may be expressed by $$\left(\sum_{\bar{b}} h_{\bar{b},k}\right),$$

and the same precoding weight $w_{b,k}$ is configured and used.

A reception end performs coherent combining with respect to a channel to a plurality of cells. Since the SFN precoding scheme sums multiple channels, it may be influenced to a relatively large degree by a phase difference from each cell.

That is, when a difference exists in the phases of respective channels to two cells, channel deterioration may occur. In other words, when two different channels are summed, a phenomenon that a channel gain reduces due to a phase difference may occur. In contrast, since the SFN precoding scheme feeds back only CDI information regarding a summed channel, an overhead for feedback may be relatively small.

The global precoding scheme includes a precoding scheme that extends the local precoding using a virtual Multiple Input Multiple Output (MIMO) channel, and refers to a precoding scheme for performing transmission via multiple channels formed from multiple cells as if it virtually performed transmission via a plurality of antennas. In addition, the global precoding scheme refers to all transmission schemes that promise precoding weight like virtually transmitting multiple channels formed at multiple transmission ends via multiple antennas such as provided by spatial multiplexing. Like the local precoding scheme, the multiple transmission ends form different precoding weights but divide one large precoding weight and use the divided weight by a promise between the transmission ends. As in Equation (2), a form where channels $h_{\bar{b},k}, \bar{b}=b,b',b''$ from three base stations to an k-th terminal are virtually stacked may be expressed by $\lfloor h_{b,k}\; h_{b',k}\; h_{b'',k} \rfloor$, and precoding weight $w_{\bar{b},k}$ are promised and used, respectively, to virtually form one large precoding weight $\lfloor w_{b,k}\; w_{b',k}\; w_{b'',k} \rfloor$. Therefore, a reception end may expect a spatial multiplexing effect obtained by multiple virtually formed channels. However, since CDI information regarding respective individual channels for virtual channel configuration should be fed back, an overhead for feedback may be relatively large.

Generally, for a multiple antenna transmission system to apply a beam forming technique, a terminal that receives the beam formed by the beam forming technique should feed back channel information of the terminal. In case of assuming a limited feedback environment, a codebook for quantizing channel information may be defined. A codebook characteristic according to each precoding scheme on the assumption of the same number of all feedback bits under the CoMP-JPT environment may be expressed by Equation (3).

$$\begin{cases} \text{Global:} & C_G = \{c_{k1}^G, \ldots, c_{kN}^G\}, c_{kn}^G \in C^{1 \times 3 \cdot N_t}, n=1, N, N=2^B \\ \text{Local:} & C_L = \{c_{k1}^L, \ldots, c_{kN}^L\}, c_{kn}^L \in C^{1 \times N_t}, n=1, N, N=2^{B/2} \\ \text{SFN:} & C_S = \{c_{k1}^S, \ldots, c_{kN}^S\}, c_{kn}^S \in C^{1 \times N_t}, n=1, N, N=2^B \end{cases} \quad (3)$$

Each terminal feeds back a codebook index similar to $\tilde{h}_{b,k}$ that is obtained by generalizing an estimated channel of the terminal to a base station, and uses Equation (4) as a method for selecting the index.

$$n^{(Mode)} = \arg\max_{1 \leq j \leq N} \left| \tilde{h}_{b,k} (c_{kj}^{(Mode)})^* \right| \quad (4)$$

Therefore, considering the number of the same feedback bits, since precoding is extended to $3 \cdot N_t$ dimensions, when compared to $N_t$ dimensions, a quantization error may be exhibited. Additionally, since the local precoding feedbacks information with independent consideration of a channel with multiple base stations, the number of quantization bits for one channel reduces by ⅓, and so a quantization error may be exhibited. In contrast, the SFN precoding scheme may quantize a channel without a loss of quantization bits in $N_t$ dimensions, but a channel gain may deteriorate when channels are summed due to the characteristic of the selected transmission method.

To select an efficient transmission method depending on a channel status by reflecting this characteristic, a Signal to Interference plus Noise Ratio (SINR) may be expressed by Equation (5).

$$SINR_{b,k} = \frac{I\rho \left| h_{b,k}^{(Mode)} (\hat{h}_{b,k}^{(Mode)})^+ \right|^2}{1 + \rho \|h_{b,k}^{(Mode)}\|^2 \sum_{j \in S_b, j \neq k} \left| \tilde{h}_{b,k} w_{b,j}^{(Mode)} \right|^2 +} \qquad (5)$$

$$\rho \sum_{\hat{b} \in B, \hat{b} \neq b, \hat{b} \neq b', \hat{b} \neq b''} \|h_{\hat{b},k}\|^2 \sum_{l \in S_{\hat{b}'}} \left| \tilde{h}_{\hat{b},k} w_{\hat{b},l} \right|^2$$

$$= \frac{\rho \|h_{b,k}^{(Mode)}\|^2 \cos^2 \theta_{b,k}^{(Mode)}}{1 + \rho \|h_{b,k}^{(Mode)}\|^2 (\sin^2 \theta_{b,k}^{(Mode)}) \sum_{j \in S_b, j \neq k} \beta(1, N_t - 2) + \rho(ICI_k)}$$

$$= \frac{\rho \|h_{b,k}^{(Mode)}\|^2 \cos^2 \theta_{b,k}^{(Mode)}}{E[\Delta^{(Mode)}]}, 1 \leq k \leq K$$

where $\rho$ represents an SNR, $(\hat{h}_{b,k}^{(Mode)})$ represents a codebook vector selected by a codebook select method, $\theta_{b,k}^{(Mode)}$ represents an quantization error of a codebook according to each precoding scheme, $\beta(1,N_t-2)$ represents beta distribution, and $E[\Delta^{(Mode)}]$ represents an expected SINR degradation according to each precoding scheme.

When $K \leq N_t$, in case of providing service to multiple terminals, in order to predict performance deterioration by a channel of a different terminal, an expected SINR degradation may be derived as shown in Equation (6).

$$E[\Delta] = E\left\{1 + \rho \|h_{b,k}\|^2 (\sin^2 \theta_{b,k}) \sum_{j \neq k} \beta(1, N_t - 2) + \rho(ICI_k)\right\} \qquad (6)$$

$$= 1 + \rho E\{\|h_{b,k}\|^2\} E\{\sin^2 \theta_{b,k}\}(N_t - 1) E\{\beta(1, N_t - 2)\} + \rho E\{ICI_k\}$$

$$= 1 + \rho N_t \left( \int_0^1 x \, dF_{\sin^2 \theta}(x) \right) (N_t - 1) \frac{1}{N_t - 1} + \rho E\{ICI_k\}$$

$$= 1 + P\left( \frac{N_t - 1}{N_t} \right) 2^{-\frac{B}{N_t - 1}} + C$$

In the expected SINR degradation, $$2^{-\frac{B}{N_t - 1}}$$

represents an upper bound of a quantization error by Voroni region, and is determined by the number of transmission antennas that generate a channel and the number of quantization bits. Additionally, $$\frac{N_t - 1}{N_t}$$

represents a factor reflecting an interference between terminals by an influence of a quantization error, and is determined by a rank of a service channel determined by the number of serviced terminals. Therefore, the expected SINR degradation may be reduced to Equation (7).

$$E[\Delta] = 1 + P\left( \frac{R - 1}{R} \right) 2^{-\frac{B}{N_t - 1}} + C \qquad (7)$$

where R represents a rank of a service channel. That is, the derived expected SINR degradation is determined by transmit power P of a transmission end, the number R of ranks of service channels between a transmission end and a reception end, the number B of feedback bits of a codebook used in the system, and the number $N_t$ of antennas of the transmission end. Physically, the expected SINR degradation denotes an interference to a multiple link between a transmission end and a reception end.

The number of interferences of other links for one link in an MIMO channel between an actual transmission end and an actual reception end has an influence having the form of $$\left( \frac{R - 1}{R} \right),$$

and has interference strength with transmission power P of a transmission end.

In a codebook formed via a Quantization cell Upper Bound (QUB) having uniform distribution, a space of a codebook may be formed by the number B of feedback bits, and the number $N_t$ of antennas of a transmission end. In this case, when a quantization error that may occur is defined as an upper bound, it can be expressed by $$2^{-\frac{B}{N_t - 1}}.$$

That is, since an increase of the number B of feedback bits causes reduction of the upper bound of a quantization error, generation of a smaller quantization error may be reflected.

In contrast, since an increase of the number $N_t$ of antennas of a transmission end means that a codebook space extends to multiple dimensions, it may cause an increase of the upper bound of the quantization error and so generation of a greater quantization error is reflected.

An interference C from a cell that does not perform cooperation is an arbitrary constant and is not a factor that has an influence in the proposed scheme and therefore, may be designated arbitrarily. The expected SINR degradation is reduced according to the above-derived precoding scheme and expressed as in Equation (8).

$$E[\Delta^{(Mode)}] \begin{cases} \text{Global: } E[\Delta^{(Global)}] = 1 + P\left[ \frac{(R^{(Global)} - 1)}{R^{(Global)}} \right] 2^{-B/(3 \cdot N_t - 1)} + C \\ \text{Local: } E[\Delta^{(Local)}] = 1 + P\left[ \frac{(R^{(Local)} - 1)}{R^{(Local)}} \right] 2^{-(B/3/(N_t - 1)} + C \\ \text{SFN: } E[\Delta^{(SFN)}] = 1 + P\left[ \frac{(R^{(SFN)} - 1)}{R^{(SFN)}} \right] 2^{-B/(N_t - 1)} + C \end{cases} \qquad (8)$$

where R represents a rank of a service channel, P represents transmission power of a transmission end, and B represents the number B of feedback bits of a codebook used in the system. That is, respective precoding schemes reflect the characteristic of a relevant precoding scheme on the assumption of the same number B of feedback bits, so that an interference for a multiple link between an actual transmission end and an actual reception end has a different form. Therefore, a terminal may determine a CDI and a CQI depending on a precoding scheme with consideration of expected SINR degradation.

FIG. 1 illustrates an example mobile communication system according to an embodiment of the present invention.

Referring to FIG. 1, the mobile communication system includes a plurality of base stations 100, 110, and 120, and a plurality of terminals 150, 160, and 170. Each base station shares channel information of a terminal to service via a backhaul network. Although the base stations 100, 110, and 120 are similar in design and construction, only one base station 100 is described herein for simplicity of description. The base station 100 includes a ZF beam former 108, a scheduler 105, and a user grouping unit 106. The scheduler 105 includes a mode selector 104, a global Semi-orthogonal User Scheduling (SUS) unit 101, a local SUS unit 102, and an SFNSUS unit 103. In addition, although the terminals 150, 160, and 170 are similar in design and construction, only one terminal 150 is described herein. The terminal 150 includes a mode selector 154, a global CQI unit 151, a local CQI unit 152, and an SFNCQI unit 153. In the drawing, other known functional blocks required for general operations of the base station and the terminal have been omitted for ease of description.

The global CQI unit 151, the local CQI unit 152, and the SFNCQI unit 153 receive a training sequence (a reference signal) from respective base stations 100, 110, 120 that perform cooperative transmission to estimate channel information and determine a CQI. At this point, the determination of the CQI is performed with consideration of expected SINR degradation. Here, since the terminals 150, 160, and 170 cannot estimate an accurate rank of a serviced channel when determining expected SINR degradation, the terminals assume that the channel has a maximum rank. In the present invention, the global CQI unit 151, the local CQI unit 152, and the SFNCQI unit 153 may be referred to as a receiver. The receiver may receive data precoded according to a precoding scheme determined by the base stations 100, 110, and 120.

The mode selector 154 selects a precoding scheme maximizing a CQI and feeds back a determined CQI and CDI to a base station. Here, CQI information is transmitted to a home base station is requesting a handover, CDI information may be distributed and transmitted to the home base station and other base stations depending on a transmission method, and a feedback amount of the CDI information is fed back with fixed bits of B bits in all transmission methods. Though not shown in the drawings, the terminal 150 may feed back a CQI, a CDI, and information regarding a precoding scheme to one base station 100, 110, or 120.

The user grouping unit 106 collects fed-back CQI and CDI of a terminal to perform user grouping according to a precoding scheme. That is, the user grouping unit 106 collects terminals that use the same precoding scheme to set respective initial candidate group sets.

After that, the global SUS unit 101, the local SUS unit 102, and the SFNSUS unit 103 perform individual user scheduling on each precoding scheme to generate a service candidate group set.

The mode selector 104 selects a precoding scheme that maximizes a transmission capacity of a service candidate group set with respect to each precoding scheme, and shares this precoding scheme with cooperating neighbor base stations via a backhaul network (Joint transmission). In addition, the ZF beam fainter 108 transmits a symbol (data) to a selected service candidate group set via a transmitter that may include a modem. The transmitter may transmit a training sequence (a reference signal) to a terminal.

Figure 2:
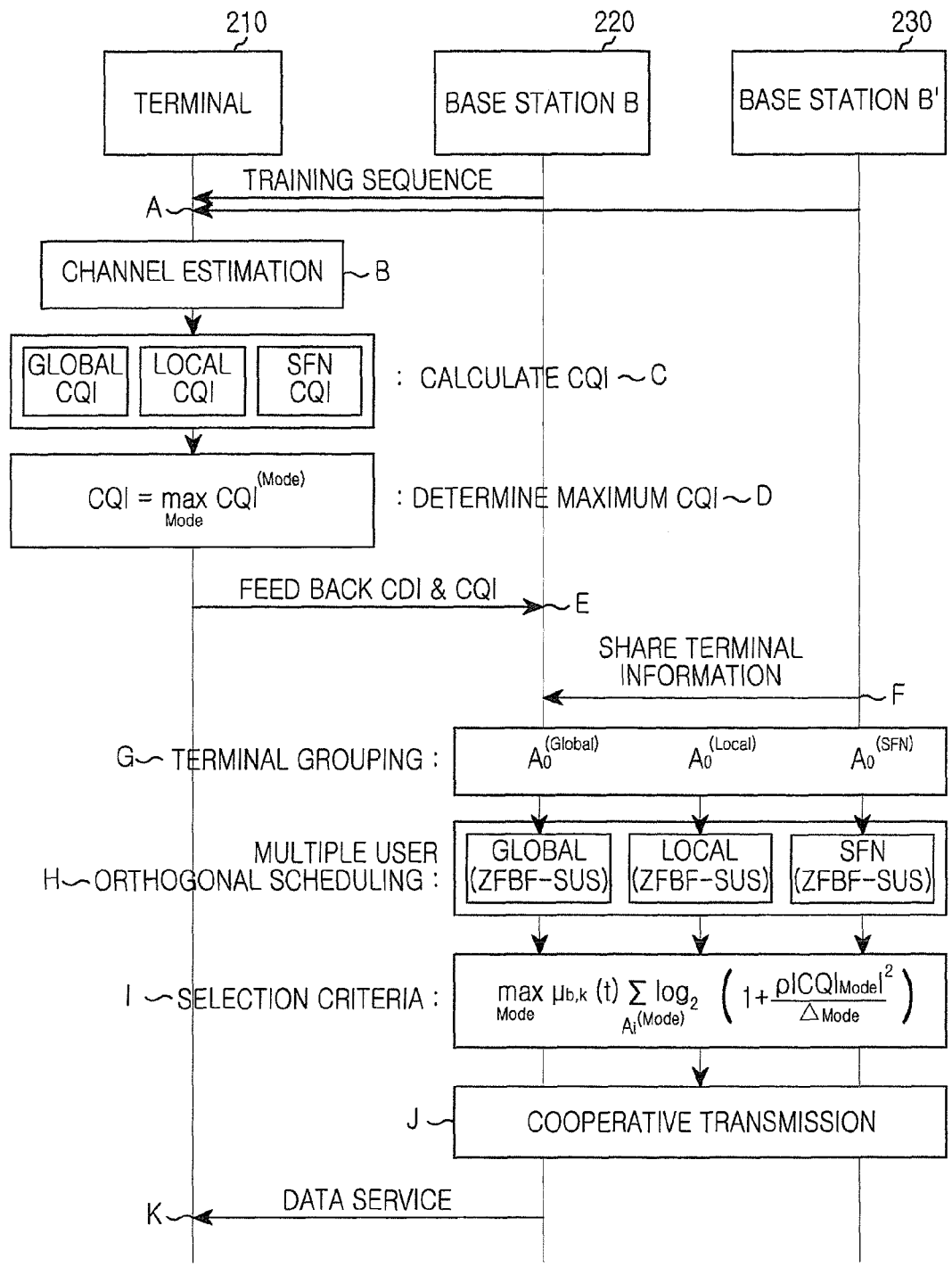
FIG. 2 illustrates an example message flow according to an embodiment of the present invention.

FIG. 2 illustrating an example message flow according to an embodiment of the present invention.

Referring to FIG. 2, a terminal 210 that receives a service of a CoMP-JPT receives a training sequence (a reference signal) from each base station performing cooperative transmission (step A) to estimate channel information (step B).

The terminal 210 selects a CDI by each precoding scheme based on the estimated channel information, and determines a corresponding CQI using Equation (9) (step C). At this point, the determination of the CQI is performed with consideration of expected SINR degradation. Here, since the terminal 210 cannot estimate an accurate rank of a serviced channel when determining expected SINR degradation, the terminal assumes that the channel has a maximum rank ($R_G=3 \cdot V$, $R_L=R_S=V$)

$$CQI(h_{b,k}^{(Mode)}) = SINR_{b,k}^{(Mode)} = \frac{\rho \|h_{b,k}^{(Mode)}\|^2 \cos^2\theta_{b,k}^{(Mode)}}{E[\Delta^{(Mode)}]} \quad (9)$$

where $\rho$ represents an SNR, $h_{b,k}^{(Mode)}$ represents a channel vector on a base station b and a user k according to a precoding scheme (mode), $\theta_{b,k}^{(Mode)}$ represents a quantization error of a codebook according to a precoding scheme, and $E[\Delta^{(Mode)}]$ represents expected SINR degradation according to each precoding scheme.

After that, a terminal selects a precoding scheme that maximizes a CQI using Equation (10) (step D) and feeds back a determined CQI and a determined CDI to a base station (step E). Here, CQI information is transmitted to a home cell that is requesting a handover, CDI information may be distributed and transmitted to the home cell and a base station depending on a transmission method, and a feedback amount of the CDI information is fed back with fixed bits of B bits in all transmission methods according to Equation (10):

$$\begin{cases} CQI: CQI^{(Mode)} = \max_{Mode} CQI(h_{b,k}^{(Mode)}) \\ CDI: n^{(Mode)} = \arg\max_{1 \le j \le N} |\tilde{h}_{b,k}(c_{kj}^{(Mode)})^*|, c_{kj} \in C_{Mode} \end{cases} \quad (10)$$

where, $h_{b,k}^{(Mode)}$ represents a channel vector on a base station b and a user k according to a precoding scheme (mode), and c represents a codebook.

After that, a base station that services a terminal collects fed-back information of a terminal (step F), and performs terminal grouping (or user grouping) according to a precoding scheme using Equation (11) (step G). That is, the base station collects terminals that use the same precoding scheme to set respective initial candidate group sets.

$$M_0^{(Mode)} = \{Mode_1, \ldots, Mode_k\}, \sum_{Mode} |A_0^{(Mode)}| = K \quad (11)$$

where $|A_0^{(Mode)}|$ represents a size of an initial candidate group set of each precoding scheme, and the sum of sizes of respective initial candidate group sets is equal to the number of all cooperative transmission candidate terminals. In addition, the term Mode represents each precoding scheme. In addition, K represents the number of all transmission candidate terminals.

After that, a base station performs terminal grouping via a ZFBF-Semi-orthogonal User Scheduling algorithm with consideration of Proportional Fairness (PF) with respect to a precoding scheme for each initial candidate group set (step H). The base station performs individual user scheduling according to each precoding scheme to generate a service candidate group set of $A_i^{(Mode)}$ where terminals up to an i-th terminal have been selected.

After that, the base station selects a precoding scheme maximizing a transmission capacity of a service candidate group set of $A_i^{(Mode)}$ according to Equation (12) with respect to each precoding scheme (step I), shares this precoding scheme with cooperating neighbor base stations via a backhaul network (Joint Transmission) (step J), and transmits a symbol to a selected service candidate group set (step K).

Since the base station may accurately know an accurate rank of a serviced channel via the size of a service candidate group set, the base station determines expected SINR degradation using $R_{(Mode)} = |A_i^{(Mode)}|$.

$$\text{Selection Criteria} \max_{Mode} \sum_{k \in A_i^{(Mode)}} \mu_{b,k}(t) \cdot \log_2(1 + SINR_{b,k}^{(Mode)}), \quad (12)$$

where $$SINR_{b,k}^{(Mode)} = \frac{\rho |CQI^{(Mode)}|^2}{E[\Delta^{(Mode)}]}$$

where the term Mode represents each precoding scheme, CQI (Mode) represents a CQI according to a precoding scheme, $E[\Delta^{(Mode)}]$ represents expected SINR degradation and so is an interference to a multiple link between a transmission end and a reception end according to a precoding scheme, and $\mu_{b,k}(t)$ represents a utility function for reflecting Proportional Fairness (PF).

As described, the present invention derives expected SINR degradation with consideration of a characteristic of a CoMP-JPT precoding technology, and utilizes the same to provide communication with between the base stations and one or more terminals. Derivation and utilization of expected SINR degradation may be utilized by a transmission end of a limited feedback environment in determining an effective transmission method by estimating an inaccuracy degree of a codebook vector.

Figure 3:
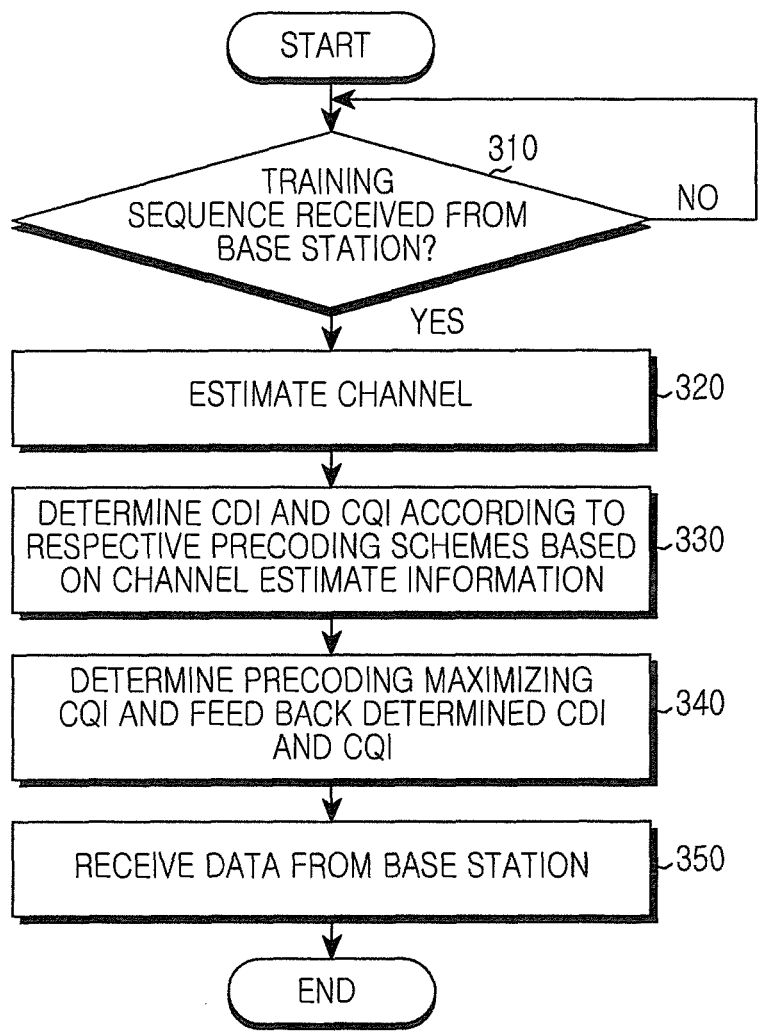
FIG. 3 illustrates an example process for operating a terminal according to an embodiment of the present invention.

FIG. 3 illustrates an example process for operating a terminal according to an embodiment of the present invention.

Referring to FIG. 3, when receiving a training sequence (a reference signal) from a base station at step 310, a terminal performs channel estimation on the reference signal at step 320.

After that, the terminal selects a CDI according to each precoding scheme based on the estimated channel information, and determines a corresponding CQI at step 330. At this point, the determination of the CQI is performed with consideration of expected SINR degradation. Since the terminal cannot estimate an accurate rank of a serviced channel when determining the expected SINR degradation, the terminal may assume that the channel has a maximum rank.

The terminal selects a precoding scheme maximizing a CQI, and feeds back determined CQI and CDI to a base station at step 340. At this point, information regarding a determined precoding scheme may be included.

The terminal receives data from the base station according to the determined precoding scheme at step 350. After this, the process as shown in FIG. 3 has ended.

Figure 4:
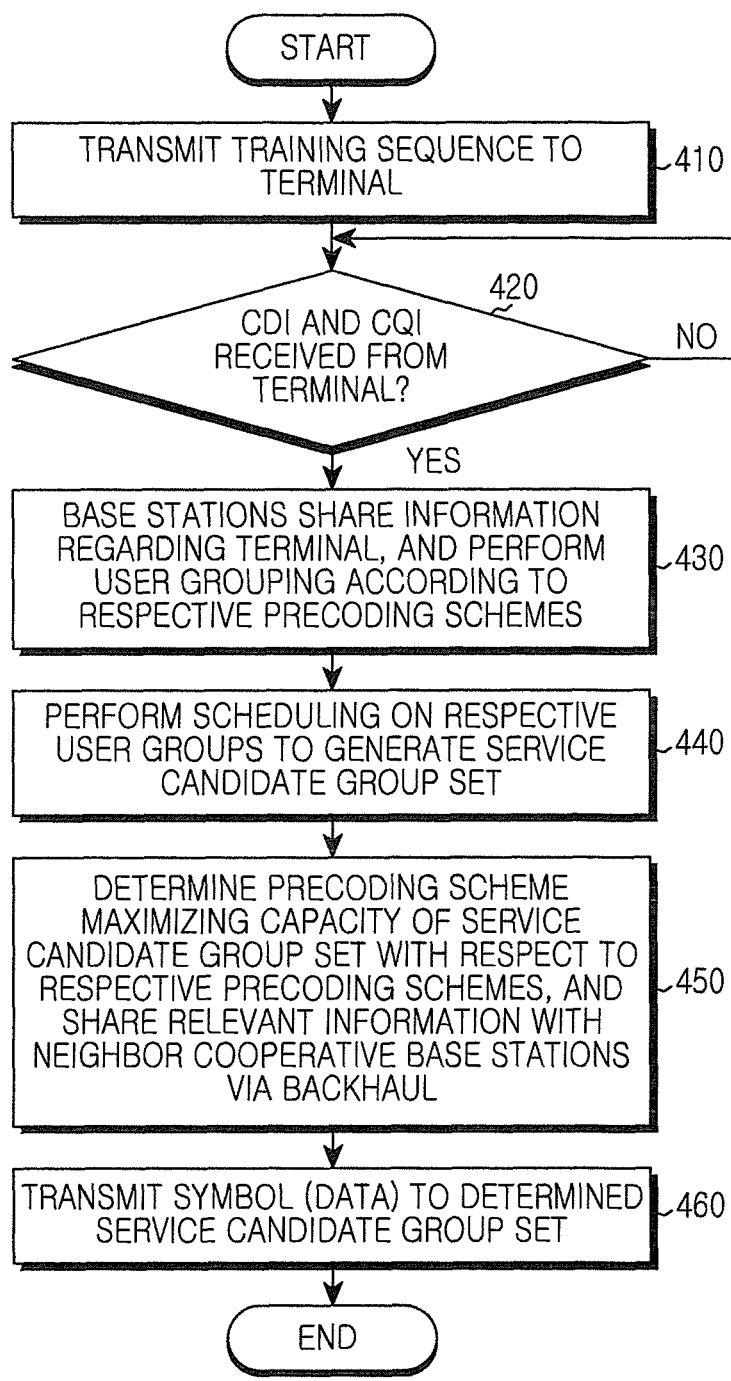
FIG. 4 illustrating an example process for operating a base station according to an embodiment of the present invention.

FIG. 4 illustrates an example process for operating a base station according to an embodiment of the present invention.

Referring to FIG. 4, the base station periodically transmits a training sequence (a reference signal) to a terminal at step 410.

When receiving a CDI and a CQI from a terminal at step 420, the base station collects the fed-back information (CDI and CQI) of the terminal to perform terminal grouping (or user grouping) according to each precoding scheme at step 430. That is, the base station collects information associated with the terminals that use the same precoding scheme to set respective initial candidate group sets. Information regarding a determined precoding scheme may be included in the information of the terminal.

The base station performs individual user scheduling according to each precoding scheme to generate a service candidate group set at step 440.

The base station determines a precoding scheme that maximizes a transmission capacity of a service candidate group set with respect to each precoding scheme, and shares this precoding scheme with neighbor base stations via a backhaul at step 450.

The base station transmits a symbol (data) to a determined candidate group set using the determined precoding scheme at step 460. After this, the process of FIG. 4 has ended.

Figure 5A:
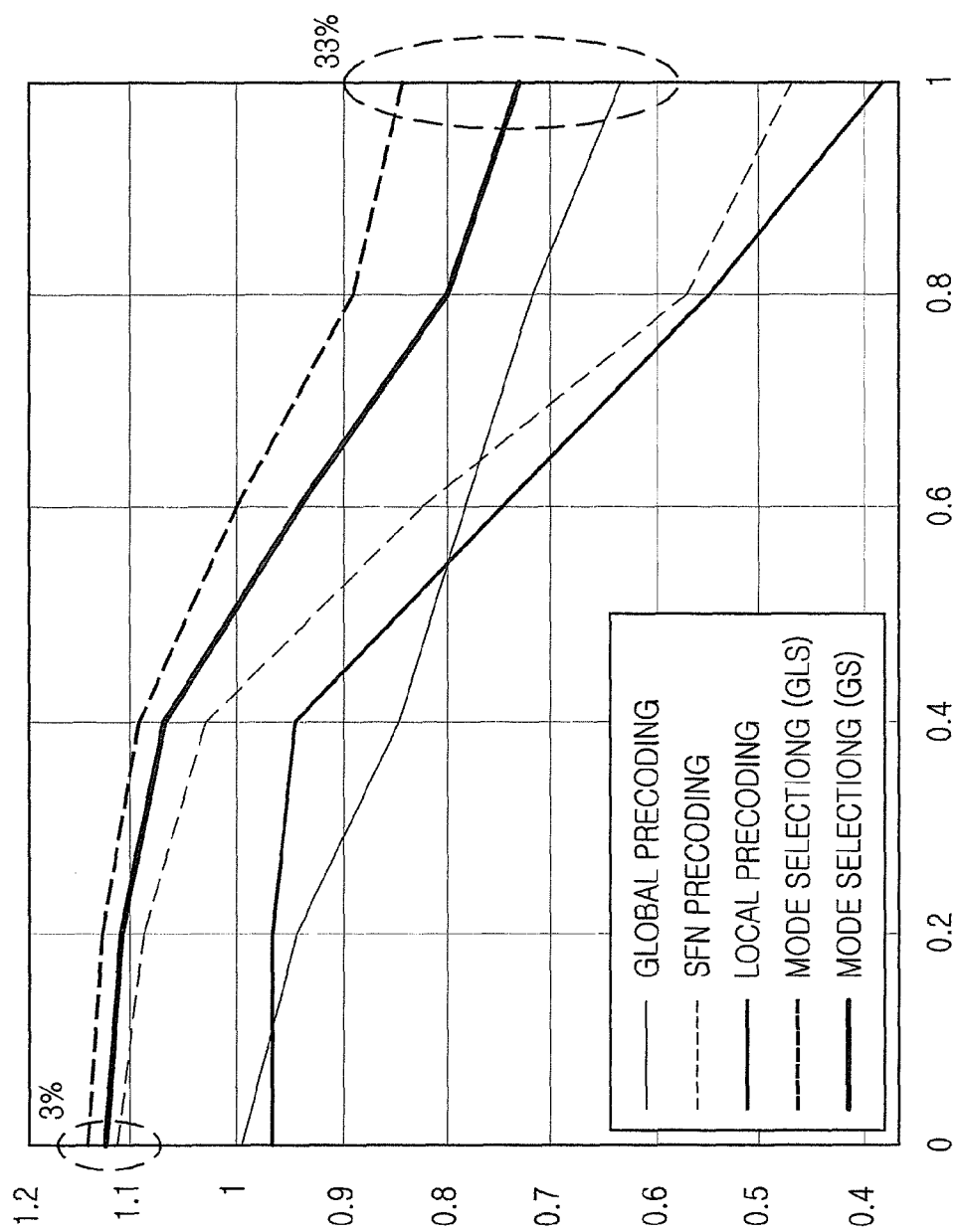
FIG. 5A illustrates an example performance analysis result of a system according to an embodiment of the present invention.

FIG. 5A and FIG. 5B illustrates example performance analysis results of a system according to an embodiment of the present invention.

Referring to FIG. 5A and FIG. 5B in a state where each sector of a cell is divided into an inner region that does not perform CoMP and an outer region that does perform CoMP, three contiguous sectors are set to perform CoMP on one another such that an influence of an interference between them may be reduced, the performance of the system is analyzed.

The system proposed by the present invention is segregated into a Global, Local, SFN Selection (GLS) mode, and a Global, SFN Selection (GS) mode, and determines a precoding scheme to operate using mode determination. Here, the GLS is a scheme considering all of respective precoding technologies, and GS is a scheme that excludes a local precoding. FIG. 5A is an average sum rate of a service terminal and FIG. 5B is a sum rate of a CoMP terminal corresponding to an outer 5% of each cell region.

The proposed system shows a better performance result compared to a reference system on the whole. When compared to an SFN system and a global precoding system having best performance among the reference systems, the proposed system is expected to have transmission capacity performance improvement of 3% to 33% depending on a threshold.

In addition, when compared to an SFN system and a global precoding system having best performance among the reference systems, a performance corresponding to an outer 5% is expected to have transmission capacity performance improvement of 3% to 22% depending on a threshold.

Therefore, under a limited feedback environment, a gain of a mode selection technology that may efficiently reflect an influence of a quantization error may be obtained.

The present invention has an advantage of efficiently servicing multiple users with consideration of a time-varying channel environment. Since the precoding scheme according, to the present invention exhibits a difference in a transmission capacity depending on a channel environment, an efficient precoding scheme may be selected, and accordingly, a transmission capacity of an entire system may be increased. More particularly, certain embodiments of the present invention may have an advantage of obtaining a higher transmission capacity by selecting a more efficient transmission method within a feedback range of fixed B bits under a limited feedback environment.

Since expected SINR degradation proposed by the present invention has been derived by reflecting, the characteristics of respective precoding technologies utilized in a CoMP-JPT environment, a transmission end of a limited feedback environment may determine an effective transmission method by estimating an inaccuracy degree of a codebook vector.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for selecting a precoding mode in a mobile communication system by a base station, the method comprising:
   receiving channel estimate information from at least one terminal;
   generating a user group according to a precoding scheme from among a plurality of precoding schemes based on the channel estimate information;
   performing individual user scheduling of the generated user group according to each precoding scheme to generate a service candidate group set;
   determining a precoding scheme that maximizes a transmission capacity of the service candidate group set for each precoding scheme, wherein the determination is based on an expected signal to interference plus noise ratio (SINR) degradation such that the SINR degradation comprises an interference to a multiple link between a transmission end and a reception end according to the determined precoding scheme; and
   transmitting data to a determined candidate group set based on the determined precoding scheme.

2. The method of claim 1, further comprising sharing the channel estimate information and the determined precoding scheme with one or more cooperating neighbor base stations via a backhaul network.

3. The method of claim 1, wherein the channel estimate information comprises at least one of a channel direction indicator (CDI), a channel quality indicator (CQI), and information regarding the determined precoding scheme.

4. The method of claim 1, further comprising collecting the channel estimation information to generate the user group according to the precoding scheme by
   collecting terminals that use the same precoding scheme to set respective initial candidate group sets according:

$$M_0^{(Mode)} = \{Mode_1, \ldots, Mode_k\}, \sum_{Mode} |A_0^{(Mode)}| = K$$

where $|A_0^{(Mode)}|$ represents a size of an initial candidate group set of each precoding scheme, the sum of sizes of the respective initial candidate group sets is equal to the number of all cooperative transmission candidate terminals, Mode represents each precoding scheme, and K represents the number of all transmission candidate terminals.

5. The method of claim 1, wherein performing individual user scheduling according to each precoding scheme to generate the service candidate group set further comprises:
   performing individual user scheduling according to the precoding scheme to generate a service candidate group set where users up to a specified number of users have been selected.

6. The method of claim 1, wherein determining the precoding scheme that maximizes the transmission capacity of the service candidate group set for each precoding scheme further comprises:
   determining the precoding scheme based on:

$$\text{Selection Criteria: } \max_{Mode} \sum_{k \in A_i^{(Mode)}} \mu_{b,k}(t) \cdot \log_2(1 + SINR_{b,k}^{(Mode)}),$$

where $$SINR_{b,k}^{(Mode)} = \frac{\rho |CQI^{(Mode)}|^2}{E[\Delta^{(Mode)}]}$$

where Mode represents each precoding scheme, $\rho$ represents a signal to noise ratio (SNR), $CQI^{(Mode)}$ represents a (CQI) according to the precoding scheme, $E[\Delta^{(Mode)}]$ represents the expected SINR degradation, and $\mu_{b,k}(t)$ represents a utility function for reflecting Proportional Fairness proportional fairness (PF).

7. The method of claim 1, further comprising estimating an inaccuracy degree of a codebook vector.

8. The method of claim 7, wherein the determination of the precoding scheme that maximizes the transmission capacity of the service candidate group set for each precoding scheme is further based on the estimated inaccuracy degree of the codebook vector.

9. The method of claim 1, further comprising determining the expected SINR degradation represented as:

$$E[\Delta] = 1 + P\left(\frac{R-1}{R}\right) 2^{\frac{B}{N_t - 1}} + C$$

where $E[\Delta]$ represents the expected SINR degradation, P represents a transmit power of a transmission end, R represents a number of ranks of service channels between a transmission end and a reception end, B represents a number of feedback bits of a codebook used in the mobile communication system, $N_t$ represents a number of antennas of the transmission end, and C represent interference from a cell that does not perform cooperation with the base station.

10. The method of claim 9, wherein C is an arbitrary constant.

11. A base station configured to select a precoding mode in a mobile communication system, the base station comprising:
   a transceiver configured to receive channel estimate information from at least one terminal;
   a user grouping unit configured to generate a user group according to a precoding scheme from among a plurality of precoding schemes associated with each terminal of the at least one terminal based on the channel estimate information; and
   a scheduler configured to perform individual user scheduling of the generated user group according to each precoding scheme to generate a service candidate group set, and determine a precoding scheme that maximizes a transmission capacity of a service candidate group set for each precoding scheme, wherein the determination is based on an expected signal to interference plus noise ratio (SINR) degradation such that the SINR degradation comprises an interference to a multiple link between a transmission end and a reception end according to the determined precoding scheme, wherein the transceiver is configured to transmit data to a determined candidate group set based on the determined precoding scheme.

12. The apparatus of claim 11, wherein the scheduler shares the channel estimate information and the determined precoding scheme with cooperating neighbor base stations via a backhaul network.

13. The apparatus of claim 11, wherein the channel estimate information comprises at least one of a channel direction indicator (CDI), a channel quality indicator (CQI), and information regarding the determined precoding scheme.

14. The apparatus of claim 11, wherein the user grouping unit is configured to collect the channel estimate information to generate the user group according to the precoding scheme by collecting terminals that use the same precoding scheme to set respective initial candidate group sets according to:

$$M_0^{(Mode)} = \{Mode_1, \ldots, Mode_k\}, \sum_{Mode} |A_0^{(Mode)}| = K$$

where $|A_0^{(Mode)}|$ represents a size of an initial candidate group set of each precoding scheme, the sum of sizes of the respective initial candidate group sets is equal to the number of all cooperative transmission candidate terminals, Mode represents each precoding scheme, and K represents the number of all transmission candidate terminals.

15. The apparatus of claim 11, wherein when performing the individual user scheduling according to each precoding scheme to generate the service candidate group set, the scheduler is configured to perform individual user scheduling according to the determined precoding scheme to generate the service candidate group set where users up to a specified number of users have been selected.

16. The apparatus of claim 11, wherein, when determining the precoding scheme maximizing the transmission capacity of the service candidate group set for each precoding scheme, the scheduler is configured to determine the precoding scheme according to:

$$\text{Selection Criteria: } \max_{Mode} \sum_{k \in A_i^{(Mode)}} \mu_{b,k}(t) \cdot \log_2\left(1 + SINR_{b,k}^{(Mode)}\right),$$

where $$SINR_{b,k}^{(Mode)} = \frac{\rho |CQI^{(Mode)}|^2}{E[\Delta^{(Mode)}]}$$

where Mode represents each precoding scheme, $\rho$ represents a signal to noise ratio (SNR), $CQI^{(Mode)}$ represents a Channel Quality Indicator (CQI) according to the precoding scheme, $E[\Delta^{(Mode)}]$ represents the expected SINR degradation, and $\mu_{b,k}(t)$ represents a utility function for reflecting proportional fairness (PF).

17. The base station of claim 11, further configured to estimate an inaccuracy degree of a codebook vector.

18. The base station of claim 17, wherein the determination of the precoding scheme that maximizes the transmission capacity of the service candidate group set for each precoding scheme is further based on the estimated inaccuracy degree of the codebook vector.

19. The base station of claim 11, further configured to determine the expected SINR degradation based on:

$$E[\Delta] = 1 + P\left(\frac{R-1}{R}\right) 2^{\frac{B}{N_t - 1}} + C$$

where $E[\Delta]$ represents the expected SINR degradation, P represents a transmit power of a transmission end, R represents a number of ranks of service channels between a transmission end and a reception end, B represents a number of feedback bits of a codebook used in the mobile communication system, $N_t$ represents a number of antennas of the transmission end, and C represent interference from a cell that does not perform cooperation with the base station.

20. The base station of claim 19, wherein C is an arbitrary constant.

* * * * *